United States Patent
Van Bodegraven et al.

(10) Patent No.: US 12,324,067 B2
(45) Date of Patent: Jun. 3, 2025

(54) LAMP DRIVER WITH VOLTAGE SENSING

(71) Applicant: SIGNIFY HOLDING B.V., Eindhoven (NL)

(72) Inventors: Tijmen Cornelis Van Bodegraven, Eindhoven (NL); Reinhold Elferich, Aachen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 321 days.

(21) Appl. No.: 18/017,747

(22) PCT Filed: Jul. 26, 2021

(86) PCT No.: PCT/EP2021/070812
§ 371 (c)(1),
(2) Date: Jan. 24, 2023

(87) PCT Pub. No.: WO2022/023243
PCT Pub. Date: Feb. 3, 2022

(65) Prior Publication Data
US 2024/0015867 A1 Jan. 11, 2024

(30) Foreign Application Priority Data
Jul. 28, 2020 (EP) .................................. 20188108

(51) Int. Cl.
*H05B 45/382* (2020.01)
*H05B 45/00* (2022.01)
*H05B 45/10* (2020.01)
*H05B 45/3725* (2020.01)
*H05B 45/385* (2020.01)

(52) U.S. Cl.
CPC .................................. *H05B 45/382* (2020.01)

(58) Field of Classification Search
CPC .... H05B 45/382; H05B 45/385; H05B 45/39; H05B 45/10; H05B 45/3725; H05B 45/00; H05B 45/37; H05B 44/00; H05B 45/30; H05B 45/355; H05B 45/38; H05B 45/36
See application file for complete search history.

(56) References Cited

U.S. PATENT DOCUMENTS

| | | | | |
|---|---|---|---|---|
| 9,360,198 B2 * | 6/2016 | Reed | ..................... | H05B 45/382 |
| 9,693,404 B1 * | 6/2017 | Xiong | .................. | H05B 45/382 |
| 9,735,669 B2 * | 8/2017 | Gao | ..................... | H05B 45/382 |
| 9,791,110 B2 * | 10/2017 | Hu | ......................... | H05B 45/14 |
| 10,476,399 B1 * | 11/2019 | Xiong | .................. | H05B 45/382 |
| 11,122,668 B1 * | 9/2021 | Xiong | .................. | H05B 45/382 |
| 2009/0237007 A1 * | 9/2009 | Leng | .................. | H05B 45/3725 |
| | | | | 315/297 |

(Continued)

FOREIGN PATENT DOCUMENTS

| | | |
|---|---|---|
| DE | 102013207675 A1 | 10/2014 |
| JP | 2001218457 A | 8/2001 |

(Continued)

*Primary Examiner* — Wei (Victor) Y Chan

(57) ABSTRACT

A lamp driver has a transformer, a primary side circuit and a secondary side circuit. The primary side circuit comprises a half bridge circuit and a sensor circuit for measuring a conduction time or switching frequency of one of the transistors of the half bridge circuit. An estimate is provided of the output voltage from the measured conduction time.

10 Claims, 2 Drawing Sheets

(56) References Cited

U.S. PATENT DOCUMENTS

| | | | |
|---|---|---|---|
| 2011/0121740 A1* | 5/2011 | Shih | H05B 45/46 |
| | | | 315/307 |
| 2012/0153866 A1* | 6/2012 | Liu | H02M 3/33561 |
| | | | 363/21.18 |
| 2014/0091718 A1 | 4/2014 | Brinlee | |
| 2014/0091720 A1* | 4/2014 | Brinlee | H05B 45/375 |
| | | | 315/186 |
| 2014/0232282 A1* | 8/2014 | Rooijackers | H02M 3/01 |
| | | | 363/21.02 |
| 2015/0077003 A1 | 3/2015 | Vonach et al. | |
| 2015/0171754 A1 | 6/2015 | Scibilia | |
| 2015/0373811 A1 | 12/2015 | Dunser et al. | |
| 2016/0143104 A1* | 5/2016 | Chen | H05B 45/3725 |
| | | | 315/200 R |
| 2018/0270924 A1* | 9/2018 | De Anna | H05B 45/385 |
| 2018/0324936 A1* | 11/2018 | Olmos | H05B 41/2827 |
| 2019/0036456 A1* | 1/2019 | Coulson | H02M 3/24 |

FOREIGN PATENT DOCUMENTS

| | | |
|---|---|---|
| JP | 2003134814 A | 5/2003 |
| JP | 2004515062 A | 5/2004 |
| JP | 2011024294 A | 2/2011 |
| JP | 2013226002 A | 10/2013 |
| WO | 2019008850 A1 | 1/2019 |

\* cited by examiner

LAMP DRIVER WITH VOLTAGE SENSING

CROSS-REFERENCE TO PRIOR APPLICATIONS

This application is the U.S. National Phase application under 35 U.S.C. § 371 of International Application No. PCT/EP2021/070812, filed on Jul. 26, 2021, which claims the benefit of European Patent application Ser. No. 20/188,108.3, filed on Jul. 28, 2020. These applications are hereby incorporated by reference herein.

FIELD OF THE INVENTION

The invention relates to lamp drivers with sensing of the voltage across the lamp.

BACKGROUND OF THE INVENTION

LEDs are increasingly the dominant light technology in domestic as well as commercial applications.

LEDs are current-driven devices, and hence LED drivers are often designed to provide a regulated output current. However, if a driver attempts to deliver a regulated current to an open circuit (e.g. with no LED arrangement connected, or with an open circuit failure mode), the voltage will rise to unacceptable levels.

For DALI drivers, there is a requirement to have an indication of the LED voltage level to the DALI microcontroller, as well as various other parameters.

Isolated drivers are often used as LED drivers, with a non-isolated primary side and an isolated secondary side. The isolation is for example provided by a transformer which forms an output stage of the LED driver. If the voltage is directly sensed at the secondary side, the voltage information needs to be supplied across the isolation barrier. This may be achieved by using a dedicated feedback microprocessor and an opto-coupler isolated interface. Alternatively, an isolating winding may be used to transfer the information concerning the LED voltage level to the non-isolated side of the driver. However, these two constructions are expensive.

It would be desirable to be able to determine the output voltage based on measurements at the primary side. However, because of the leakage inductance inside the transformer, it is not possible for the measurement of the voltage of a winding at the non-isolated primary side of the transformer to give a sufficiently accurate indication of the LED voltage level.

SUMMARY OF THE INVENTION

The invention is defined by the claims.

According to examples in accordance with an aspect of the invention, there is provided a lamp driver comprising:
  a transformer;
  a primary side circuit including a primary side winding of the transformer; and
  a secondary side circuit including a secondary side winding of the transformer, isolated from the primary side circuit, the secondary side circuit for delivering an output voltage and an output current to a lamp load,
  wherein the primary side circuit comprises:
    a half bridge circuit having a high side transistor and a low side transistor with a node between them;
    a controller for controlling the switching of the high side and low side transistors; and
    a sensor circuit for measuring a conduction time or switching frequency of the high side transistor or the low side transistor,
    wherein the controller is adapted to derive an estimate of the output voltage from the measured conduction time.

This lamp driver is able to derive an estimate of the output voltage based on primary side sensing. The invention is based on the realization that the switching frequency of the convertor decreases when the output voltage increases, and vice versa. By measuring the conduction time or switching frequency of one of the transistors, a good indication of the output voltage can be obtained.

The controller may be configured to provide compensation for the primary side (bus) voltage, the output current and/or non-linearities in the transfer function.

The controller is for example adapted to drive each of the high side and low side transistors with a fixed 50% duty cycle. Thus, the control of the high side and low side switches implements a frequency control rather than a duty cycle control. The resulting frequency then directly correlates with the conduction time durations of either of the transistors.

The controller preferably derives the estimate of the output voltage further from one or more of:
  a pre-determined transfer function relating the conduction time or switching frequency to the output voltage;
  the output current; and/or
  a supply voltage within the primary side circuit.

Thus, the controller can take account of the operating characteristics of the driver (primary side voltage, output current) when determining the output voltage.

The lamp driver may further comprise an isolated feedback circuit for monitoring the output current and providing a feedback signal to the primary side circuit. Thus, the output current may also be used to enhance the voltage estimation. A current feedback mechanism is for example already required to implement output current regulation.

The sensor circuit may comprise a sense capacitor which is charged by the gate drive signal of the high side transistor or the low side transistor and a peak detector circuit comprising a diode connected between the sense capacitor and a peak signal storage capacitor.

The conduction time is represented by the peak voltage stored on the capacitor, which is charged during the conduction time. Using peak detection, a DC voltage may be generated which can be easily monitored by a microprocessor on the non-isolated side of the driver.

The sensor circuit may comprise a charge transistor between the gate of the high side transistor or the gate of the low side transistor and the sense capacitor, wherein the charge transistor is turned on by a high gate drive signal of the high side transistor or the low side transistor. Thus, when the high or low side transistor is turned on, the capacitor is charged by a conduction path through the charge transistor.

The sensor circuit may further comprise a discharge path including a diode from the sense capacitor to the gate of the high side or low side transistor.

The discharge of the capacitor is then until the forward voltage drop of the diode. The diode forward drop has a temperature dependency may be used to provide temperature compensation for the temperature dependency of the charge transistor, i.e. the base-emitter voltage of the charge transistor.

The sensor circuit is for example for measuring a conduction time or switching frequency of the low side transistor. This enables a simpler and lower cost monitoring circuit that for the high side transistor.

The primary side circuit may further comprise a capacitor between the node and the primary side winding, wherein the capacitor and the primary side winding form, or form part of, a resonant LLC circuit.

A resonant LLC circuit is a known low cost driver circuit.

The invention also provides a lighting system comprising:
the lamp driver as defined above; and
an LED arrangement which comprises the lamp load.

The lighting system is for example incorporated in a luminaire.

The invention also provides a lamp driving method comprising:
performing half wave rectification by controlling the switching of a high side transistor and a low side transistor within a primary side circuit at the primary side of a transformer of a lamp driver;
delivering an output voltage and an output current to a lamp load using a secondary side circuit at the secondary side of the transformer;
measuring a conduction time or switching frequency of the high side transistor or the low side transistor; and
deriving an estimate of the output voltage from the measured conduction time.

The method may comprise deriving the estimate of the output voltage further from one or more of:
a pre-determined transfer function relating the conduction time or switching frequency to the output voltage;
the output current; and
a supply voltage within the primary side circuit.

The method for example comprises measuring a conduction time of the low side transistor.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
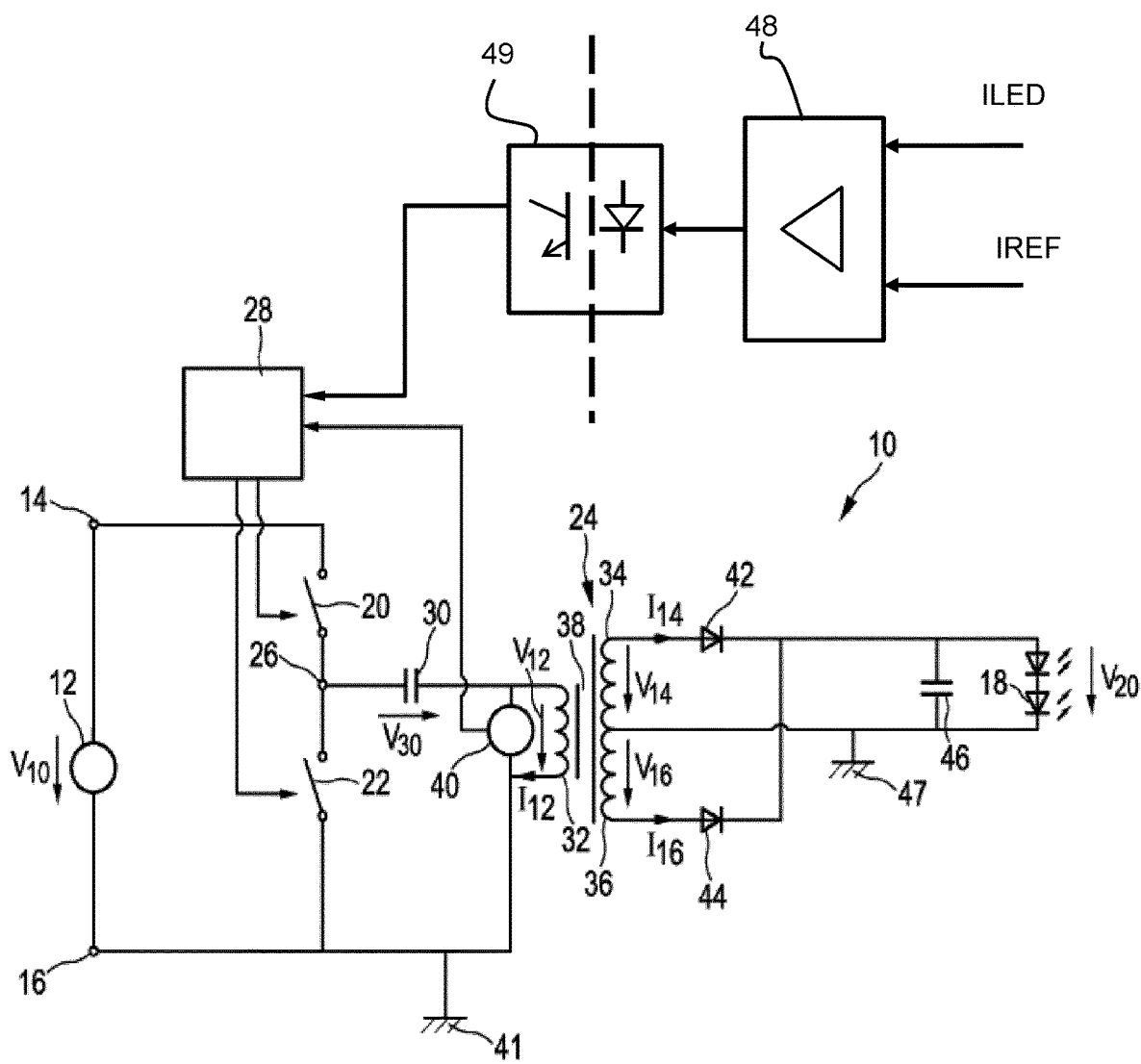
FIG. 1 shows a schematic block diagram of a known driver device which makes use of an LLC converter.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

FIG. 1 shows a schematic block diagram of a known driver device which makes use of an LLC converter, generally denoted by 10. FIG. 1 is corresponds to a driver device as described more fully in WO 2014/060899, to which reference is made for further details.

The driver device 10 is connected to a voltage supply 12 which provides a supply voltage V10. The driver device 10 is connected to the voltage supply 12 by means of the input terminals 14, 16. The driver device 10 converts the input voltage V10 to an output voltage V20 for powering a load 18, which is in the particular embodiment shown in FIG. 1 formed as an LED unit 18.

The driver device 10 comprises two controllable switches 20, 22 and an electromagnetic converter unit 24 (e.g. an LLC circuit) for converting the input voltage V10 to the output voltage V20 for powering the load 18. The input voltage V10 is a direct voltage or a rectified voltage rectified by means of a rectifier (not shown) connected to an AC voltage supply. The controllable switches 20, 22 are connected in series to each other and are connected in parallel to the input terminals 14, 16. The controllable switches 20, 22 are connected to each other to form a half bridge circuit, wherein a node 26 between the controllable switches 20, 22 forms an output terminal of the half bridge circuit. The driver device 10 comprises a controller 28 for controlling the controllable switches 20, 22.

The controller 28 switches the controllable switches 20, 22 alternating to provide an alternating voltage to the node 26 and to the electromagnetic converter unit 24 as explained below. For simplicity, the controller 28 may be considered to comprise also the DALI microcontroller to which the output voltage is reported.

The node 26 of the half bridge circuit is connected to the electromagnetic converter unit 24. The electromagnetic converter unit 24 is formed of an resonant capacitor 30 and a transformer comprising a primary winding 32, two secondary windings 34, 36 and an electromagnetic coupling member 38 for coupling the primary winding 32 and the second windings 34, 36. It is noted that instead of using two windings with single sided rectification it is also possible to have one winding with a bridge rectifier. The primary winding 32 and the resonant capacitor 30 are connected in series to each other, wherein the resonant capacitor may be connected to the node 26 as shown in FIG. 1 or connected to the input terminal 16.

The electromagnetic converter unit 24 comprises a measurement device 40 for providing one or more feedback signals. It may be based on primary side control or secondary side control.

In the position shown in FIG. 1, the measurement device 40 may be for measuring a primary voltage V12 at the primary winding 32. As one alternative, the measurement device may be positioned for measuring a capacitor voltage V30 at/across the resonant capacitor 30. As a further example, the measurement device may be positioned for measuring the combination of the capacitor voltage V30 and the primary voltage, e.g. the voltage at/across the resonant capacitor 30 and the primary winding 33.

The measurement device 40 may be connected to a series connection of the primary winding 32 and an additional inductance (not shown) for measuring a corresponding primary side voltage.

In other implementations of the measurement device 40, the primary side current may be measured (for example using a resistor in series with the controllable switches or measuring a primary current in the primary winding) and/or the secondary side voltage may be measured by making use of an auxiliary winding and voltage measurement circuit coupled to the auxiliary winding (as explained above). However, this adds cost and complexity to the circuit.

In all cases, the measurement device 40 is connected to the controller 28 for providing a corresponding measurement signal to the controller 28 for controlling the controllable switches 20, 22.

The driver device 10 further comprises a feedback circuit for monitoring the output current and providing a feedback signal to the primary side circuit. The feedback circuit comprises a comparator circuit 48 for comparing a sensed output current ILED with a target current IREF. The result of the comparison forms a feedback signal which is provided to the primary side using an opto-coupler 49, although another isolating communication mechanism may be used. The feedback signal is used by the controller 28 to control the switching such that the desired regulated current is delivered to the lamp load.

In the case shown in FIG. 1, the primary winding 32 is connected to a primary ground 41. Alternatively, the resonant capacitor 30 may be connected to the primary ground 41 and the primary winding 32 may be connected to the node 26. The primary voltage V12 and the primary current 112 in the primary winding 32 is transformed to two secondary voltages V14, V16 and two secondary currents 114, 116 provided by the secondary windings 34, 36, respectively. The secondary windings 34, 36 are each connected via a diode 42, 44 and an output capacitor 46 and to the load 18 for providing a direct output current and a direct voltage as the output voltage V20 to the load 18 for powering the load. The secondary ground 47 can be either connected to or isolated from the primary ground 41.

The controllable switches 20, 22 form a half bridge circuit. They are switched alternately to provide a pulsed (e.g. square-wave) voltage to the node 26. The output voltage V20 and the secondary currents 114, 116 depend on the waveform of the primary voltage V12 and can be controlled by a switching frequency of the controllable switches 20, 22 and a duty cycle of an on-time of the controllable switches 20, 22. The controller 28 receives a measurement signal from the measurement device 40 and controls the controllable switches 22 on the basis of the measured signal.

Further details of the known operation of the circuit may be found in WO 2014/060899.

It is well known to operate a resonance LLC converter with a fixed 50% duty cycle. The operating frequency is adapted in response to feedback signals, for example for providing a regulated output current.

The known circuit does not enable accurate measurement of the output voltage only based on measurements at the primary side.

The invention is based on the recognition that the switching frequency of the electromagnetic converter unit 24 (e.g. LLC convertor) decreases when the LED voltage increases. By measuring the conduction time for example of the low side transistor, a good indication of the LED voltage can be obtained. A compensation can be made for the primary side circuit bus voltage, the LED current and/or non-linearities in the transfer function.

The invention thus provides a lamp driver with a transformer 24, a primary side circuit and a secondary side circuit. The primary side circuit comprises a half bridge circuit and a sensor circuit 50 for measuring a conduction time of one of the transistors of the half bridge circuit. An estimate is provided of the output voltage from the measured conduction time.

Figure 2:
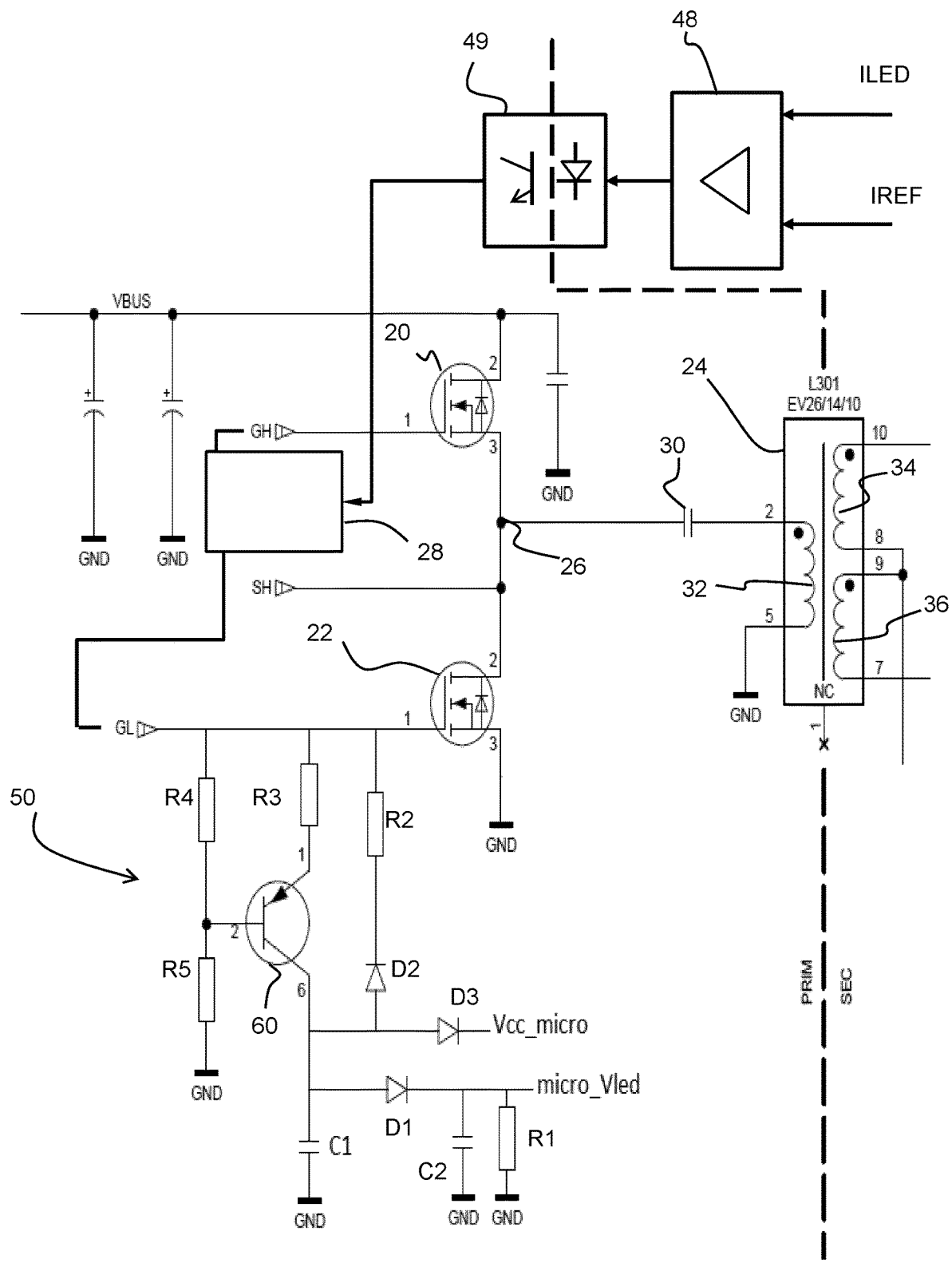
FIG. 2 shows an example of a circuit in accordance with the invention.

FIG. 2 shows an example of a circuit in accordance with the invention. The same reference numbers are used as in FIG. 1 for the same components.

The circuit comprises a lamp driver having a transformer 24, a primary side circuit including a primary side winding 32 of the transformer and a secondary side circuit including a secondary side winding 34, 36 of the transformer, isolated from the primary side circuit. The secondary side circuit is for delivering an output voltage and an output current to a lamp load.

The primary side circuit again comprises a half bridge circuit having a high side transistor 20 and a low side transistor 22 with a node 26 between them. The controller 28 controls the switching of the high side and low side transistors.

The primary side circuit further comprises a resonant capacitor 30 between the node 26 and the primary side winding 32. The resonant capacitor 30 and the primary side winding 32 form, or form part of, a resonant LLC circuit.

In accordance with the invention, there is a sensor circuit 50 for measuring a conduction time or switching frequency of the high side transistor 20 or the low side transistor 22. In the example shown, the measuring circuit is associated with the low side transistor 22 as this gives a simpler circuit implementation (because the gate-source voltage is referenced to ground). However, since both transistors have the same 50% duty cycle, the conduction time of either may be used.

In the example described below, the controller 28 derives an estimate of the output voltage from a measured conduction time. This estimation is thus made based on primary side sensing, avoiding the need for an additional isolated feedback path (i.e. additional to the current feedback path 48, 49). The voltage sensing is based on the realization that the switching frequency of the convertor decreases when the output voltage increases. By measuring the conduction time or switching frequency of one of the transistors, a good indication of the output voltage can be obtained.

The output voltage may be derived from the conduction time or switching frequency using a pre-determined transfer function relating the conduction time or the switching frequency to the output voltage. However, this pre-determined transfer function will also depend on the output current ILED and/or the supply voltage (VBUS) within the primary side circuit. Thus, one or both of these parameters may be used as additional inputs to the controller 28 in order to make a more accurate estimate of the output voltage.

The sensor circuit 50 in this example comprises a sense capacitor C1 which is charged by the gate drive signal GL of the low side transistor (in this example).

The charging of the sense capacitor C1 takes place through a transistor 60 (a bipolar transistor in this example). The base voltage is defined by a resistor divider R4, R5 from the gate drive signal GL. The transistor 60 functions as a constant current source which charges sense capacitor C1. The transistor 60 is turned on by the high gate drive signal GL, as a result of the base voltage created by the voltage divider R4, R5. The sense capacitor C1 is then charged through the feed resistor R3.

The gate voltage is a constant level, so the base voltage and hence emitter voltage is constant during the high gate voltage. As a result, there is a constant voltage across the feed resistor R3 and hence a constant supply current. The voltage reached across the sense capacitor C1 is thus a linear function of the time of charging (assuming it is discharged to a fixed start voltage).

The sense capacitor C1 is connected to a peak detector circuit comprising a diode D1 connected (in the forward direction) between the sense capacitor C1 and a peak signal storage capacitor C2. Thus, the peak voltage across the sense capacitor C1 (i.e. the voltage it reached during charging) is provided to the capacitor C2, and the capacitor C2 is prevented from discharging to the sense capacitor C1 by the diode D1.

The peak signal storage capacitor C2 is in parallel with a discharge resistor R1. The sense capacitor C1 is charged and discharged during each switching cycle of the half bridge circuit. The time constant established by the resistor capacitor, RC, circuit C2, R1 is much longer than the conduction time of the low side transistor 22. For example, the time constant may be of the order of 1 second whereas the high side and low side transistors are typically switched at a kHz frequency.

The peak voltage across sense capacitor C1 is indicative of the conduction time (for a preceding time period related to the time constant of R1 and C2). The detected peak signal micro_Vled is provided to the controller 28.

The sensor circuit 50 further comprises a discharge path including a diode D2 and resistor R2 from the sense capacitor C1 to the gate of the low side transistor. During the dead time and the conduction time of the high side transistor 20, the sense capacitor C1 is discharged through by the gate driver (of the low side transistor 22) via the resistor R2 until the forward voltage drop of diode D2 is reached. Discharging of the sense capacitor C1 via the gate driver of the low side resistor, e.g. rather than directly to ground, advantageously avoids unintended shorting of any gate voltage provided to the low side transistor 22 via the transistor 60 (e.g. through a diode resistor series pair hypothetically connected between the sense capacitor C1 and ground).

The temperature dependency of the base emitter voltage (for example around −2 mV/K) of the transistor 60, which will then influence the constant current generated by the current source circuit of the transistor 60, is partly compensated by the temperature dependency of the forward voltage drop across the diode D2 (also around −2 mV/K).

Vcc_micro is the DALI microcontroller supply voltage. The capacitor C1 is connected to this supply voltage through diode D3. When the voltage on sense capacitor C1 exceeds this level by an amount corresponding to the forward voltage drop of diode D3, the voltage on sense capacitor C1 cannot increase any further. Thus, the maximum voltage for micro_Vled is clamped to Vcc_micro plus the forward voltage drop of diode D3 minus the forwards drop of D1. Thus, the maximum voltage is clamped to around Vcc_micro.

The invention makes use of the fact that the LLC frequency changes by only a small amount when the output voltage is constant. There is a frequency change in response to a LED current change (e.g. a resulting from a change in current setting), but this is small compared to the frequency difference caused by voltage changes. Because the change in frequency caused by voltage is dominant, and also the controller knows the current setting, the small change in frequency caused by the current can be compensated for in the controller.

Thus, the switching frequency provides an indication of the LED voltage level (a high LED voltage results in a low switching frequency and a low LED voltage results in a high switching frequency).

The LED voltage level is on the secondary side whereas the DALI microcontroller, which needs to be provided with the LED voltage level, is on the primary side. The crossing of the mains isolation to provide voltage feedback is achieved in a very cost effective way, by sensing the switching frequency or the conduction time of the high or low side half inverter transistor.

The example above provides timing of the conduction time by charging a capacitor with a constant current and measuring the obtained voltage. However, other methods for measuring the time duration may be employed or other methods of measuring frequency may be used.

The circuit of FIG. 2 forms a lighting system when an LED arrangement is provided as the load. Such a lighting system is for example incorporated in a luminaire.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lamp driver comprising:
a transformer;
a primary side circuit including a primary side winding of the transformer; and
a secondary side circuit including a secondary side winding of the transformer, isolated from the primary side circuit, the secondary side circuit for delivering an output voltage and an output current to a lamp load,
wherein the primary side circuit comprises:
a half bridge circuit having a high side transistor and a low side transistor with a node between them;
a controller for controlling the switching of the high side and low side transistors; and
a sensor circuit for measuring a conduction time or switching frequency of the high side transistor or the low side transistor,
wherein the controller is adapted to derive an estimate of the output voltage from the measured conduction time or switching frequency,
wherein the controller is adapted to derive the estimate of the output voltage using a pre-determined transfer function relating the conduction time or the switching frequency to the output voltage together with the output current and/or a supply voltage (VBUS) within the primary side circuit.

2. The lamp driver of claim 1, wherein the controller is adapted to drive each of the high side and low side transistors with a fixed 50% duty cycle.

3. The lamp driver of claim 1, further comprising an isolated feedback circuit for monitoring the output current and providing a feedback signal to the primary side circuit.

4. The lamp driver of claim 1, wherein the sensor circuit comprises a sense capacitor which is charged by the gate drive signal of the high side transistor or the low side transistor and a peak detector circuit comprising a diode connected between the sense capacitor and a peak signal storage capacitor.

5. The lamp driver of claim 4, wherein the sensor circuit comprises a charge transistor between the gate of the high side transistor or the gate of the low side transistor and the sense capacitor, wherein the charge transistor is turned on by a high gate drive signal of the high side transistor or the low side transistor.

6. The lamp driver of claim 4, wherein the sensor circuit further comprises a discharge path including a diode (from the sense capacitor to the gate of the high side or low side transistor.

7. The lamp driver of claim 1, wherein the primary side circuit further comprises a capacitor between the node and the primary side winding, wherein the capacitor and the primary side winding form, or form part of, a resonant LLC circuit.

8. A lighting system comprising:
the lamp driver according to claim 1; and
an LED arrangement which comprises the lamp load.

9. The lighting system according to claim 8 incorporated in a luminaire.

10. A lamp driving method comprising:
performing half wave rectification by controlling the switching of a high side transistor and a low side transistor within a primary side circuit at the primary side of a transformer of a lamp driver;
delivering an output voltage and an output current to a lamp load using a secondary side circuit at the secondary side of the transformer;
measuring a conduction time or switching frequency of the high side transistor or the low side transistor; and
deriving an estimate of the output voltage using a predetermined transfer function relating the conduction time or the switching frequency to the output voltage together with the output current and/or a supply voltage within the primary side circuit.

* * * * *